United States Patent
Paulzagade et al.

(10) Patent No.: US 10,095,422 B2
(45) Date of Patent: Oct. 9, 2018

(54) SYSTEMS AND METHODS FOR ALLOCATING INPUT/OUTPUT BANDWIDTH IN STORAGE SYSTEMS

(71) Applicant: Veritas Technologies LLC, Mountain View, CA (US)

(72) Inventors: Sudhakar Paulzagade, Pune (IN); Prasanna Wakhare, Pune (IN); Niranjan Pendharkar, Pune (IN)

(73) Assignee: Veritas Technologies, LLC, Mountain View, CA (US)

( * ) Notice: Subject to any disclaimer, the term of this patent is extended or adjusted under 35 U.S.C. 154(b) by 56 days.

(21) Appl. No.: 15/337,667

(22) Filed: Oct. 28, 2016

(65) Prior Publication Data
US 2018/0121102 A1   May 3, 2018

(51) Int. Cl.
*G06F 3/06* (2006.01)

(52) U.S. Cl.
CPC ............ *G06F 3/0611* (2013.01); *G06F 3/068* (2013.01); *G06F 3/0631* (2013.01)

(58) Field of Classification Search
CPC ....... G06F 3/0611; G06F 3/0613; G06F 3/068
See application file for complete search history.

(56) References Cited

U.S. PATENT DOCUMENTS

| | | | | |
|---|---|---|---|---|
| 5,907,556 | A * | 5/1999 | Hisanaga | H04L 47/10 370/235 |
| 6,108,306 | A * | 8/2000 | Kalkunte | H04L 12/5602 370/235 |
| 6,735,633 | B1 * | 5/2004 | Welch | H04L 29/06 709/233 |
| 6,947,998 | B2 * | 9/2005 | Mekkittikul | H04L 12/2852 370/468 |

(Continued)

OTHER PUBLICATIONS

Assuring Quality of Service; http://www.docs.cloudbyte.com/what-is-elasticenter/assuring-quality-of-service/; accessed on Oct. 17, 2016; CloudByte ElastiStor; Feb. 14, 2015.

*Primary Examiner* — Midys Rojas
*Assistant Examiner* — Khoa D Doan
(74) *Attorney, Agent, or Firm* — FisherBroyles LLP

(57) ABSTRACT

The disclosed computer-implemented method for allocating input/output bandwidth in storage systems may include (1) allocating, in accordance with a pre-defined service-level agreement, an assigned amount of input/output bandwidth to an application that performs actions on a storage system, (2) receiving a request from the application to perform an input/output operation on the storage system, (3) identifying an amount of latency associated with fulfilling the input/output operation, (4) calculating, based at least in part on the amount of latency associated with fulfilling the input/output operation, an amount of input/output bandwidth consumed by the input/output operation, (5) deducting the amount of input/output bandwidth consumed by the input/output (Continued)

operation from the assigned amount of input/output bandwidth allocated to the application, and (6) allocating bandwidth to future input/output requests from the application from the remaining amount of input/output bandwidth allocated to the application. Various other methods, systems, and computer-readable media are also disclosed.

20 Claims, 5 Drawing Sheets

(56) References Cited

U.S. PATENT DOCUMENTS

| | | | | |
|---|---|---|---|---|
| 7,092,396 B2* | 8/2006 | Lee | | H04L 12/5602 370/230.1 |
| 7,260,635 B2* | 8/2007 | Pandya | | H04L 29/06 709/226 |
| 7,738,492 B2* | 6/2010 | Lauwers | | H04L 41/0896 370/468 |
| 8,195,888 B2* | 6/2012 | Solihin | | G06F 12/0862 711/129 |
| 2003/0028641 A1* | 2/2003 | Zhang | | H04L 41/0896 709/226 |
| 2004/0103193 A1* | 5/2004 | Pandya | | H04L 41/0896 709/224 |
| 2006/0178918 A1* | 8/2006 | Mikurak | | G06Q 10/06 705/7.25 |
| 2009/0296700 A1* | 12/2009 | Stevens | | H04L 45/00 370/389 |
| 2011/0276972 A1* | 11/2011 | Chung | | G06F 9/5016 718/103 |
| 2011/0276973 A1* | 11/2011 | Chung | | G06F 13/1663 718/103 |
| 2014/0164600 A1* | 6/2014 | Archer | | H04L 43/0882 709/224 |
| 2017/0078712 A1* | 3/2017 | Resuta | | H04N 21/2385 |

* cited by examiner

SYSTEMS AND METHODS FOR ALLOCATING INPUT/OUTPUT BANDWIDTH IN STORAGE SYSTEMS

BACKGROUND

Digital storage systems provide integral services for a variety of computing systems. For example, an enterprise may run a storage system to manage backup images of critical computing systems. Other storage systems host databases used in various online activities, from database management to content hosting. Larger storage systems may host and/or manage data for many different applications or entities, often utilizing various quality-of-service systems to allocate storage-system bandwidth between such applications entities based on system capacity, demand, and/or applicable service-level agreements.

Unfortunately, traditional quality-of-service systems generally evaluate the "cost" of performing an input/output operation on a storage system based merely on the size of the requested operation. For example, traditional quality-of-service systems often assume that a 64 KB input/output operation "costs" twice as much to execute as a 32 KB operation since the 64 KB operation is twice the size of the 32 KB operation. However, because the actual impact of an operation may not scale linearly with its size, traditional quality-of-service systems may waste significant amounts of processing bandwidth. The instant disclosure, therefore, identifies and addresses a need for improved systems and methods for allocating input/output bandwidth in storage systems.

SUMMARY

As will be described in greater detail below, the instant disclosure describes various systems and methods for allocating input/output bandwidth in storage systems based on the actual impact of (e.g., latency introduced by) input/output operations rather than simply the size of such input/output operations. In one example, a computer-implemented method for performing such a task may include (i) allocating, in accordance with a pre-defined service-level agreement, an assigned amount of input/output bandwidth to an application that performs actions on a storage system, (ii) receiving a request from the application to perform an input/output operation on the storage system, (iii) identifying an amount of latency associated with fulfilling the input/output operation, (iv) calculating, based at least in part on the amount of latency associated with fulfilling the input/output operation, an amount of input/output bandwidth consumed by the input/output operation, (v) deducting the amount of input/output bandwidth consumed by the input/output operation from the assigned amount of input/output bandwidth allocated to the application, and (vi) allocating bandwidth to future input/output requests from the application from the remaining amount of input/output bandwidth allocated to the application.

In one example, identifying the amount of latency associated with fulfilling the input/output operation may include measuring an amount of time taken to complete the input/output operation. Additionally or alternatively, identifying the amount of latency associated with fulfilling the input/output operation may include calculating an estimated amount of latency that will be induced by the input/output operation based at least in part on whether the size of the input/output operation includes a group of sequential input/output operations. In some embodiments, calculating the estimated amount of latency may include calculating the estimated amount of latency based on previous observations of input/output operations that are similar to the input/output operation.

In some examples, the amount of input/output bandwidth consumed by the input/output operation that is deducted from the assigned amount of input/output bandwidth allocated to the application may be proportional to the latency induced by the input/output operation instead of just the size of the input/output operation.

In some embodiments, receiving the request from the application may include receiving a request to perform a plurality of input/output operations. In such embodiments, receiving the request from the application may include treating the plurality of input/output operations as a single input/output operation. For example, treating the input/output operations as a single input/output operation may include calculating the total input/output bandwidth consumed by the input/output operations and deducting the total amount of input/output bandwidth consumed by the input/output operations.

The disclosed computer-implemented method may receive requests to perform various input/output actions on the storage system. In some examples, the request from the application may include a request to perform (i) a backup operation, (ii) a restore operation, (iii) a recovery operation, and/or (iv) a replication operation.

In some examples, allocating the assigned amount of input/output bandwidth to the application may include allocating the assigned amount of input/output bandwidth based on both the number of applications that request input/output bandwidth from the storage system and the capacity of the storage system to perform input/output operations. In some embodiments, allocating bandwidth to future input/output requests from the application from the remaining amount of input/output bandwidth allocated to the application may include preventing the application from performing at least one future input/output operation on the storage system in response to determining that the application has an insufficient amount of input/output bandwidth remaining to perform the future input/output operation.

In some embodiments, a system for implementing the above-described method may include (i) an allocation module, stored in memory, that allocates, in accordance with a pre-defined service-level agreement, an assigned amount of input/output bandwidth to an application that performs actions on a storage system, (ii) a receiving module, stored in memory, that receives a request from the application to perform an input/output operation on the storage system, (iii) an identification module, stored in memory, that identifies an amount of latency associated with fulfilling the input/output operation, (iv) a calculation module, stored in memory, that calculates, based at least in part on the amount of latency associated with fulfilling the input/output operation, an amount of input/output bandwidth consumed by the input/output operation, (v) a deduction module, stored in memory, that deducts the amount of input/output bandwidth consumed by the input/output operation from the assigned amount of input/output bandwidth allocated to the application, and (vi) at least one physical processor configured to execute the allocation module, the receiving module, the identification module, the calculation module, and the deduction module. The allocation module may also allocate bandwidth to future input/output requests from the application from the remaining amount of input/output bandwidth allocated to the application.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) allocate, in accordance with a pre-defined service-level agreement, an assigned amount of input/output bandwidth to an application that performs actions on a storage system, (ii) receive a request from the application to perform an input/output operation on the storage system, (iii) identify an amount of latency associated with fulfilling the input/output operation, (iv) calculate, based at least in part on the amount of latency associated with fulfilling the input/output operation, an amount of input/output bandwidth consumed by the input/output operation, (v) deduct the amount of input/output bandwidth consumed by the input/output operation from the assigned amount of input/output bandwidth allocated to the application, and (vi) allocate bandwidth to future input/output requests from the application from the remaining amount of input/output bandwidth allocated to the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
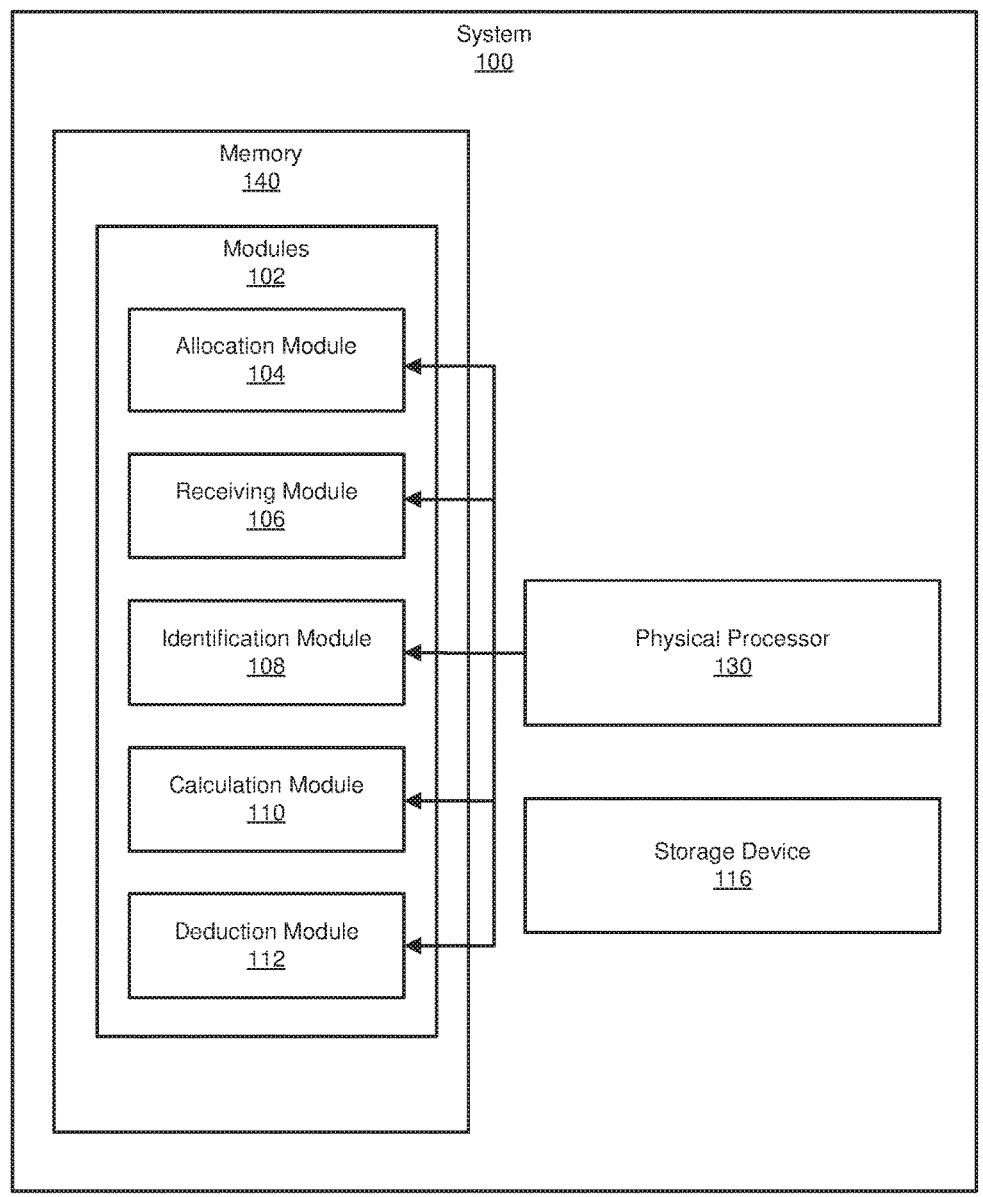
FIG. 1 is a block diagram of an example system for allocating input/output bandwidth in storage systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for allocating input/output bandwidth in storage systems. As will be described in greater detail below, by allocating input/output bandwidth to applications based on system impact rather than just operation size, the disclosed systems and methods may enable a more efficient use of the actual bandwidth available to a storage system. For example, an 8 KB input/output operation may induce 4 ms of latency in a storage system while a 256 KB operation may induce 6 ms of latency. Even though the 256 KB operation transfers 32 times the volume of data, it may only induce 50% more latency than the 8 KB operation. Traditional quality-of-service systems that allocate bandwidth to applications simply based on the size of the input/output requests issued by those applications may therefore end up underutilizing the actual bandwidth available to the storage system. By instead allocating bandwidth based on the actual impact of (e.g., latency introduced by) the input/output operation, the disclosed systems and methods may improve the functioning of storage systems by allowing those systems to more fully utilize available processing bandwidth.

Figure 2:
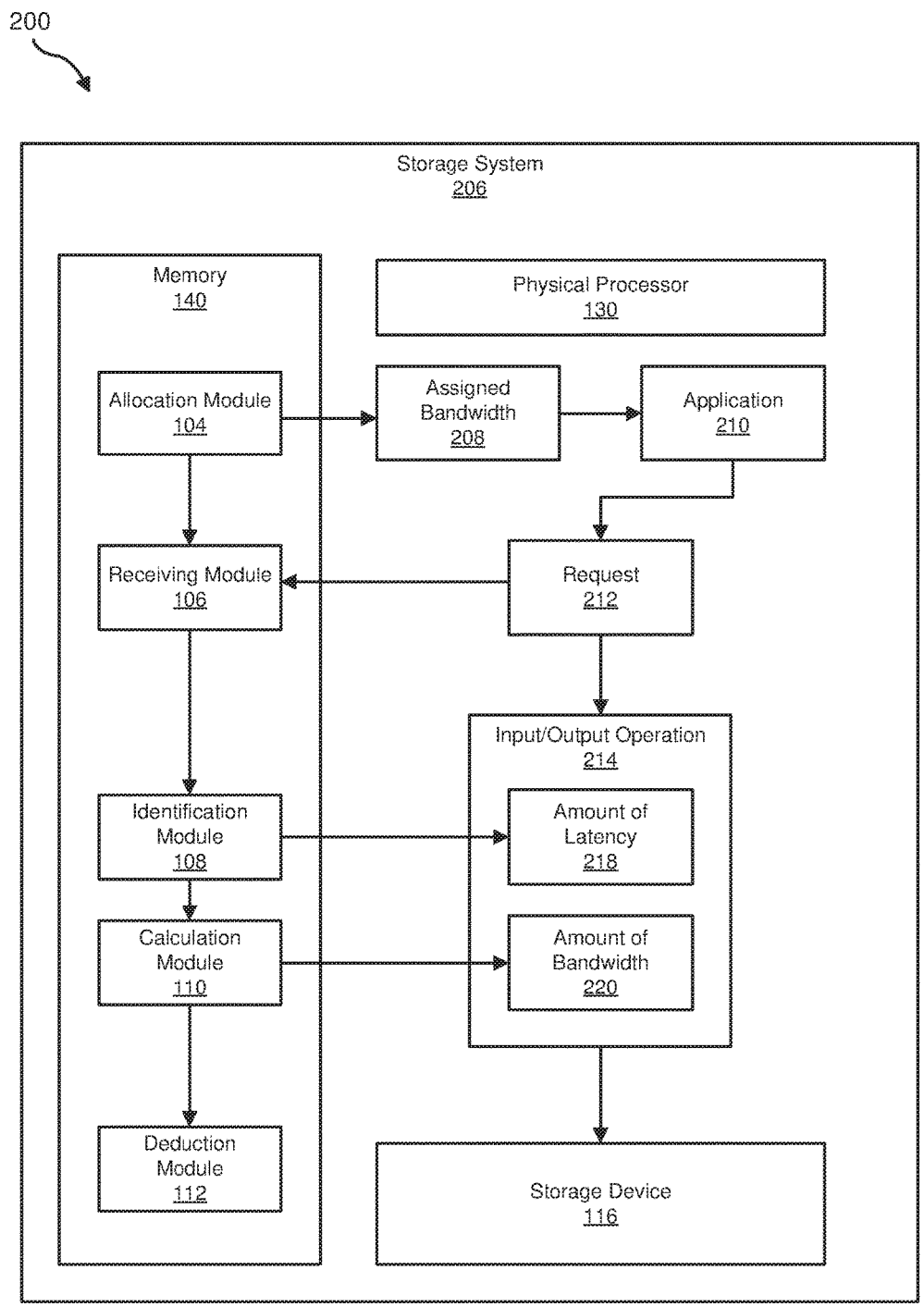
FIG. 2 is a block diagram of an additional example system for allocating input/output bandwidth in storage systems.

The following will provide, with reference to FIGS. 1-2, detailed descriptions of example systems for allocating input/output bandwidth in storage systems. Detailed descriptions of corresponding computer-implemented methods will also be provided in connection with FIG. 3. Detailed descriptions of an example sequential request will be provided in connection with FIG. 4, and detailed descriptions of an additional example system for allocating input/output bandwidth will be provided in connection with FIG. 5.

FIG. 1 is a block diagram of an example system 100 for allocating input/output bandwidth in storage systems. As illustrated in this figure, system 100 may include one or more modules 102 for performing one or more tasks. For example, and as will be explained in greater detail below, system 100 may include an allocation module 104, a receiving module 106, an identification module 108, a calculation module 110, and a deduction module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., storage system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate allocating input/output bandwidth in storage systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, system 100 may include one or more storage devices. Storage device 116 generally represents any type or form of computing hardware or storage medium that is capable of storing digital information. Examples of storage device 116 include, without limitation, hard drive disks, solid state drives, flash drives, combinations of one or more of the same (e.g., arrays), or any other suitable medium for storing digital information.

Example system 100 in FIG. 1 may be implemented in a variety of ways. For example, all or a portion of example system 100 may represent portions of example system 200 in FIG. 2. As shown in FIG. 2, system 200 may include a storage system 206. In one example, all or a portion of the functionality of modules 102 may be performed by storage system 206 and/or any other suitable computing system. As will be described in greater detail below, one or more of modules 102 from FIG. 1 may, when executed by at least one processor of storage system 206, enable storage system 206 to allocate bandwidth to applications based on the actual impact that those applications have on the functioning of the storage system rather than simply the size of the operations performed by the applications.

Storage system 206 generally represents any type or form of computing device that is capable of allocating operation bandwidth to applications that seek to perform input/output operations. For example, storage system 206 may include a system of servers that store backup and recovery information for endpoint devices. In such examples, the data managed by storage system 206 may be used by a system recovery application on a computing device. As an additional example, storage system 206 may include and/or operate as part of a cloud storage solution that provides storage system functionality over a network such as the Internet. In these examples, the data managed by storage system 206 may serve as a database for web-based applications, such as an online store or advertising service. Storage system 206 may also include one or more storage devices to store data, such as storage device 116. Additional examples of storage system 206 include, without limitation, storage servers, database servers, application servers, and/or web servers configured to run certain software applications and/or provide various storage, database, and/or web services. Although illustrated as a single entity in FIG. 2, storage system 206 may include and/or represent a plurality of servers that work and/or operate in conjunction with one another.

Application 210 generally represents any type or form of software that utilizes a storage system, such as storage system 206, as part of its intended and usual operation. For example, application 210 may represent a system image deployment application that replicates a system image stored by storage system 206 to multiple endpoint devices. Additionally or alternatively, application 210 may represent a file integrity application that regularly backs up information stored on a computing device to storage system 206. In these examples, application 210 may also perform restore and/or recovery operations for computing device 202 using information stored on storage system 206. Furthermore, application 210 may represent a hosted application executing on a server that stores data through storage system 206. In these examples, storage system 206 may be incorporated as part of the server.

Input/output operation 214 generally represents any operation that either reads data from or writes data to storage system 206. Some procedures, such as a backup operation, may be composed of many different input/output operations. For example, a backup operation may request to write several hundred files to storage system 206. Such batch requests for input/output operations may sometimes be referred to as "sequential requests," as will be described in greater detail below. Input/output operations may consume processing time and/or cause a delay in the ability of a storage system to handle further requests. This impact on the ability of the storage system to handle other input/output operations generally referred to herein as "latency."

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
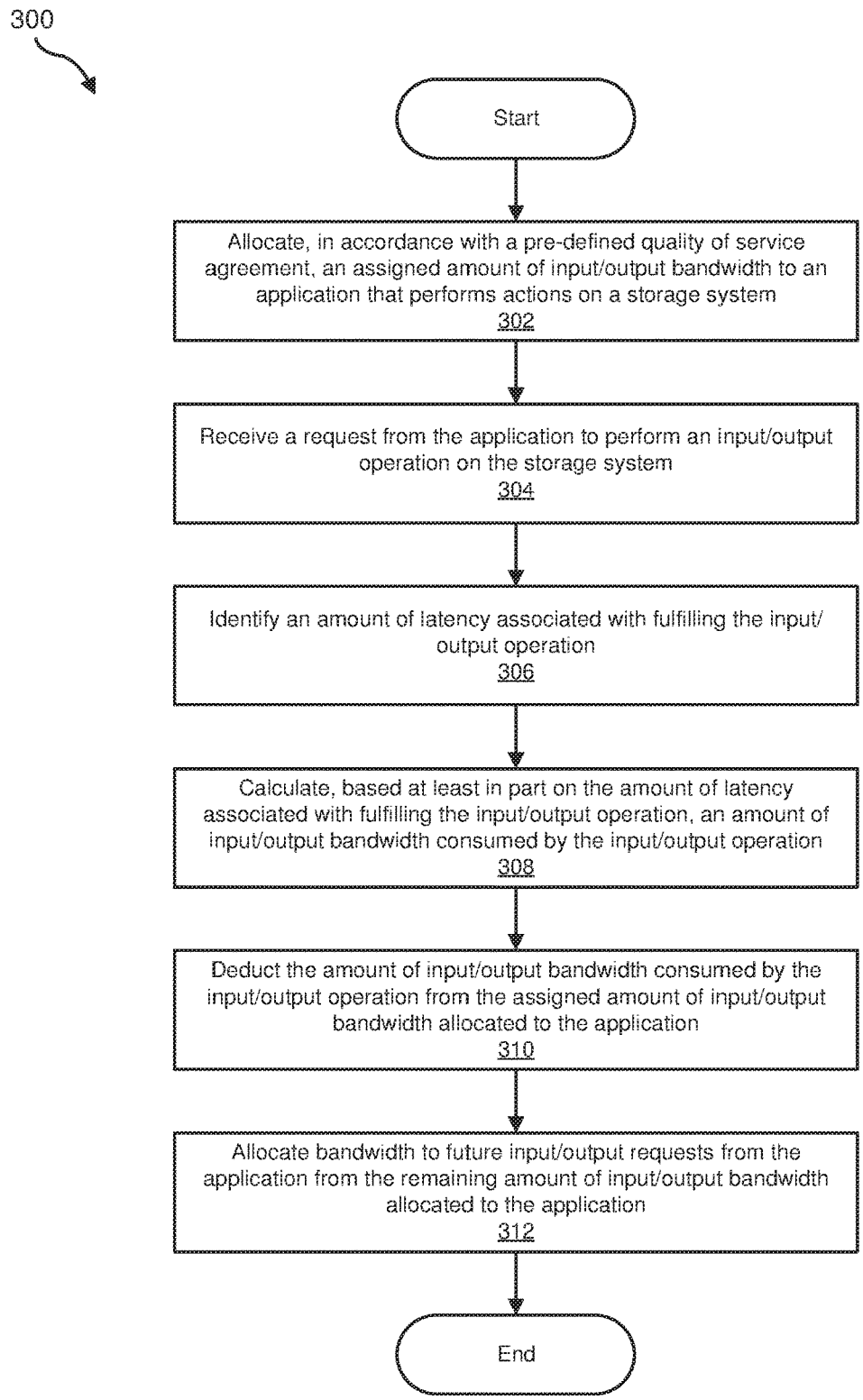
FIG. 3 is a flow diagram of an example method for allocating input/output bandwidth in storage systems.

FIG. 3 is a flow diagram of an example computer-implemented method 300 for allocating input/output bandwidth in storage systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may allocate, in accordance with a pre-defined service-level agreement, an assigned amount of input/output bandwidth to an application that performs actions on a storage system. For example, allocation module 104 may, as part of storage system 206 in FIG. 2, allocate, in accordance with a pre-defined service-level agreement, assigned bandwidth 208 to application 210 that requests to perform input/output operation 214 on storage system 206.

The term "service-level agreement," as used herein, generally refers to any formalized agreement between a storage system service provider and a customer, individual, or organization that describes a commitment on behalf of the service provider to provide a certain amount of storage system bandwidth to the customer. Storage system providers may utilize quality-of-service systems to ensure that they are able to fulfill the service-level agreement. For example, a storage system service provider may guarantee a certain amount of input/output throughput per second to a customer in addition to a guaranteed amount of data transfer per month. A quality-of-service system may balance bandwidth requests from all customers with service-level agreements in order to ensure that the provisions of each service-level agreement are met. For example, a customer who has not yet exceeded their monthly data transfer cap may receive a larger or higher-priority allocation of bandwidth over a customer who has exceeded their monthly data transfer cap. As a specific example, the systems and methods described herein may assign more "credits" to an application executed by a customer with a higher tier service-level agreement than to an application executed by a customer with a lower tier service-level agreement.

Allocation module 104 may attempt to balance the capacity of the storage system to perform input/output actions with the number of applications requesting to perform input/output actions. In some embodiments, allocation module 104 may allocate assigned bandwidth 208 to application 210 by allocating the assigned bandwidth 208 based on both the number of applications that request input/output bandwidth from storage system 206 and the capacity of storage system 206 to perform input/output operations. In certain examples, allocation module 104 may simply allocate a certain amount of processing time to each application. As a specific example, in a system involving two applications requesting to perform input/output operations on storage system 206, allocation module 104 may allocate 500 ms of processing time per second to each application. In some embodiments, allocation module 104 may grant certain applications higher priority, or more processing time per tick, based on a variety of factors. These factors may include such things as an administrator of the application designating an operation as critical or high priority, a subscriber to a storage service paying a fee for increased bandwidth in accordance with a so-called Service Level Agreement, or any other suitable metric for determining how much processing time should be allocated to each application.

As will be described in greater detail below, allocation module 104 may additionally or alternatively allocate bandwidth to applications by assigning a certain number of "credits" to each application that performs actions on storage system 206. Each credit may represent a certain amount of bandwidth, a certain amount of allowable induced latency, or any other suitable metric for measuring input/output bandwidth allocation. Other elements of modules 102 may deduct credits from the balance assigned to an application whenever that application performs operations on storage system 206.

At step 304 in FIG. 3, one or more of the systems described herein may receive a request from the application to perform an input/output operation on the storage system. For example, receiving module 106 may, as part of storage system 206 in FIG. 2, receive request 212 from application 210 to perform input/output operation 214 on storage device 116.

Receiving module 106 may receive a variety of requests from application 210. For example, receiving module 106 may receive a request to perform a single input/output operation. Specifically, application 210 may submit a request to write a single file to storage system 206. Alternatively, application 210 may submit a request to read a single file from storage system 206.

In some embodiments, receiving module 106 may receive a request to perform multiple input/output operations. Such a request may seek to read and/or write multiple files to and/or from storage system 206. For example, the request may be a request to perform a backup operation, a restore operation, a recovery operation, a replication operation, and/or any other operation composed of multiple read/write operations. As will be described in greater detail below, handling these sequential requests may incur less overhead processing time than if each component input/output operation were handled as an individual request due to a variety of factors, such as processing time involved with accepting and parsing the information in each request.

Returning to FIG. 3 at step 306, one or more of the systems described herein may identify an amount of latency associated with fulfilling the input/output operation. For example, identification module 108 may, as part of storage system 206 in FIG. 2, identify an amount of latency 218 associated with fulfilling input/output operation 214.

Identification module 108 may identify the amount of latency associated with fulfilling input/output operation 214 in a variety of ways. In some embodiments, identification module 108 may identify the amount of latency associated with fulfilling the input/output operation by measuring the actual amount of time required to complete the input/output operation. For example, identification module 108 may identify the amount of latency associated with fulfilling input/output operation 214 by measuring when storage system 206 begins processing input/output operation 214 and when storage system 206 completes processing input/output operation 214. Identification module 108 may then treat the difference between the start and stop times as the total amount of latency induced by fulfilling input/output operation 214.

Additionally or alternatively, identification module 108 may identify the amount of latency associated with fulfilling the input/output operation by calculating an estimated amount of latency that will be induced by the input/output operation. For example, identification module 108 may utilize a mathematical operation to estimate the amount of latency that will be induced by a given input/output operation. In some examples, the above-described mathematical operation may be based on previous observations of the latency induced by various input/output operations. Specifically, identification module 108 may update variables used in the mathematical operation based on further observations of the latency induced by various input/output operations to ensure that the calculated latency provides an accurate estimate of the actual latency induced by any given input/output operation. For example, if the mathematical operation assumes that 8 KB input/output operations induce 4 ms of latency but the systems and methods described herein observe that 8 KB operations induce 5 ms of latency, identification module 108 may update the variables used by the mathematical operation based on this observed information. As a specific example, identification module 108 may calculate a normalized latency for an operation by multiplying the size of the operation by the time taken to complete the operation divided by the transfer rate of the operation. Identification module 108 may additionally or alternatively estimate the latency of a particular operation based on the calculated normalized latency of an operation that is the same size as the particular operation. As will be described in greater detail below, other elements of modules 102 may use this normalized latency in combination with a reference latency (i.e., a normalized latency calculated for an input/output operation of a predetermined type and/or size) as part of determining how much allocated bandwidth will be charged against the bandwidth allocated to application 210 upon fulfillment of input/output operation 214.

In some embodiments, identification module 108 may calculate the estimated amount of latency by calculating the estimated amount of latency based on previous observations of input/output operations that are similar to the input/output operation. For example, identification module 108 may determine that 256 KB read requests directed to a particular storage device induce 8 ms of latency, while 256 KB read requests directed to a different storage device induce 7.5 ms of latency. Identification module 108 may accordingly estimate that future 256 KB read requests directed to the first storage device induce 8 ms of latency, while future 256 KB read requests directed to the second storage device induce 7.5 ms of latency. Note that the two example input/output operations induce different amounts of latency in the storage system despite requesting identical volumes of data transfer.

Figure 4:
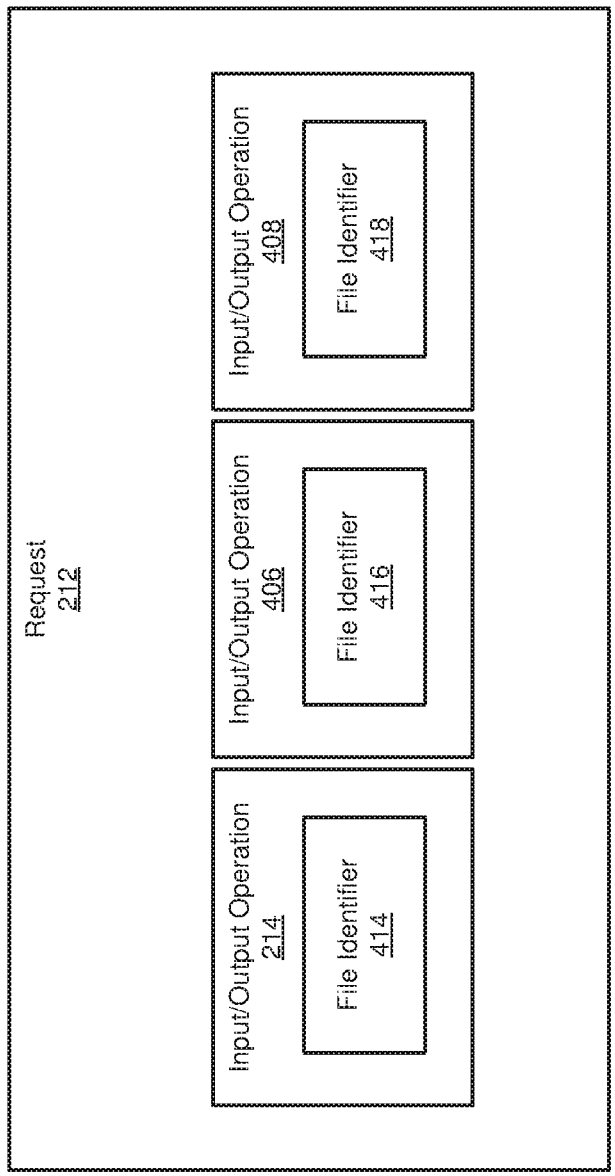
FIG. 4 is a block diagram of an example sequential request.

Additionally or alternatively, identification module 108 may calculate the latency induced by an input/output operation based at least in part on whether the input/output operation necessitates and/or is composed of sequential input/output operations. A request that necessitates and/or is composed of sequential input/output operations may be referred to as a sequential request. An illustrated example of a sequential request is provided in FIG. 4. As shown in FIG. 4, request 212 may include a request to perform input/output operations 214, 406, and 408 as part of performing a backup operation to back up various files to storage system 206. Each input/output operation that is part of request 212 may apply to a different file. In the example of FIG. 4, these operations are directed to files represented by file identifiers 414, 416, and 418, respectively. However, since input/output operations 214, 406, and 408 were submitted as part of the same larger request (i.e., the backup operation), the systems and methods described herein may treat these operations as sequential operations or sequential requests. In other words, storage system 206 may be able to process input/output operations 214, 406, and 408 more efficiently and with less system impact than three similar input/output operations that are submitted separately. As will be described in further detail below, the systems and methods described herein may accordingly "charge" less bandwidth against the bandwidth allocated to an application that submits requests in a more efficient manner than an application that submits inefficient requests, even if the contents of those requests would otherwise be identical.

In some examples, receiving module 106 may receive the request from the application by treating the plurality of input/output operations as a single input/output operation. Certain embodiments of the disclosed systems and methods may estimate the impact of a request on the storage system based on the size of the request. Larger requests and sequential requests may utilize storage system capacity more efficiently than multiple smaller requests that are submitted more or less at random. Accordingly, receiving module 106 may treat input/output operations that are submitted as part of a sequential operation or request as a single larger input/output operation. As a specific example and with returning reference to FIG. 4, receiving module 106 may treat input/output operations 214, 406, and 408 as part of a single larger operation for the purposes of allocating input/output bandwidth to the application that submitted request 212.

As described in connection with FIG. 4, certain operations, such as backup, restore, replicate, etc., may perform sequential input/output operations on storage system 206. Furthermore, the latency induced by an operation may not scale directly with the size of the operation, and sequential operations may induce less latency than individually or randomly requested operations. The systems and methods described herein may therefore treat sequential operations as a single larger operation for purposes of allocating bandwidth to the application that requested the sequential operations. As a specific example, a set of sequential operations may include requests to perform four input/output operations of 8 KB each. Because sequential operations require less overhead processing time and may induce less latency than a similar volume of randomly submitted operation requests, the systems and methods described herein may estimate the latency induced by a set of four sequential operations for 8 KB each as though they were a single 32 KB input/output operation. The systems and methods described herein may also combine the input/output operations in any suitable fashion beyond the methods described here.

In some embodiments, identification module 108 may calculate an estimated amount of latency based on previous observations of input/output operations that are similar to the requested input/output operation. For example, two input/output operations that are directed to different physical storage media but are otherwise identical (e.g., transferring the same file over the same network through the same storage system) may induce differing amounts of latency. As a specific example, an input/output operation that transfers a 256 KB file to a hard drive disk may induce a different amount of latency than an input/output operation that transfers the exact same file to a solid state drive. Identification module 108 may accordingly estimate 256 KB file transfers directed to the hard drive disk based at least partly on previous 256 KB operations directed to that hard drive disk, and estimate 256 KB file transfers directed to the solid state drive based on 256 KB operations directed to that solid state drive.

At step 308 in FIG. 3, one or more of the systems described herein may calculate, based at least in part on the amount of latency associated with fulfilling the input/output operation, an amount of input/output bandwidth consumed by the input/output operation. For example, calculation module 110 may, as part of storage system 206 in FIG. 2, calculate, based at least in part on amount of latency 218 associated with fulfilling input/output operation 214, an amount of input/output bandwidth consumed by input/output operation 214.

Calculation module 110 may calculate the consumed input/output bandwidth in a variety of ways. In some examples, calculation module 110 may simply use the latency induced by fulfilling input/output operation 214 as the consumed input/output bandwidth. Alternatively, calculation module 110 may convert the latency estimated and/or observed by identification module 108 into credits. For example, calculation module 110 may calculate credits relative to the latency induced by an operation of a specific reference size. As a specific example, calculation module 110 may count the latency induced by an operation of 8 KB as equivalent to one credit. An input/output operation that induces twice as much latency in storage system 206 as the reference operation may "cost" an application two credits. Note that the described credits system calculates costs based on the latency induced by an input/output operation rather than the size of the input/output operation. As described above, operations that are many times larger than the reference operation may nevertheless cause a relatively smaller increase in the induced latency. Calculation module may determine that an input/output operation costs partial credits (e.g., 2.1 credits), round the cost to the next highest whole number (e.g., round 2.5 credits to 3 credits), or apply any other suitable mathematical operation to determine the credit cost of any given input/output operation on storage system 206.

In embodiments where identification module 108 has identified a normalized latency for input/output operation 214, calculation module 110 may use this normalized latency in combination with a previously calculated reference latency to determine the credit cost of performing input/output operation 214. For example, calculation module 110 may divide the normalized latency of input/output operation 214 by the reference latency to determine the credit cost of input/output operation 214. As a specific example, identification module 108 may have previously established a reference latency of 4 ms^2 as costing one credit. Identification module 108 may then identify a normalized latency of 6 ms^2 for input/output operation 214. Calculating module 110 may divide 6 ms^2 by 4 ms^2 to determine that input/output operation 214 costs 1.5 credits to fulfill. Note that the sizes of the operations used to calculate the reference latency and the normalized latency are irrelevant in this example calculation; the systems and methods described herein may treat an 8 KB operation that causes 6 ms^2 of normalized latency the same as a 256 KB operation that causes 6 ms^2 of normalized latency for the purposes of allocating input/output bandwidth.

At step 310, one or more of the systems described herein may deduct the amount of input/output bandwidth consumed by the input/output operation from the assigned amount of input/output bandwidth allocated to the application. For example, deduction module 112 may, as part of storage system 206 in FIG. 2, deduct the amount of input/output bandwidth consumed by input/output operation 214 from assigned bandwidth 208.

Deduction module 112 may deduct the consumed input/output bandwidth in a variety of contexts. For example, the systems and methods described herein may maintain a database of bandwidth allocated to each application that performs operations on storage system 206. As described in connection with calculation module 110, this database may include a balance of "credits" or other representation of bandwidth assigned to applications. In this example, deduction module 112 may simply subtract the consumed credits from the balance of credits allocated to application 210 and then update the database with the remaining amount of bandwidth allocated to application 210.

In some embodiments, identification module 108 and/or calculation module 110 may estimate the bandwidth that will be consumed by a particular input/output operation before storage system 206 fulfills the request. In these embodiments, one or more elements of modules 102 may verify that application 210 has a sufficient credit balance remaining to perform the requested input/output operation. As will be described in greater detail below, allocation module 104 may then prevent storage system 206 from fulfilling request 212 based on application 210 having insufficient remaining assigned bandwidth to fulfill input/output operation 214. In cases where allocation module 104 prevents application 210 from performing an input/output operation, deduction module 112 may refrain from deducting credits from application 210 for the blocked operation.

As with other elements of modules 102, deduction module 112 may treat several input/output operations as a single, larger input/output operation for purposes of allocating bandwidth to application 210. For example, deduction module 112 may calculate the total input/output bandwidth consumed by the of input/output operations and deduct the total amount of input/output bandwidth consumed by the input/output operations from assigned bandwidth 208.

Figure 5:
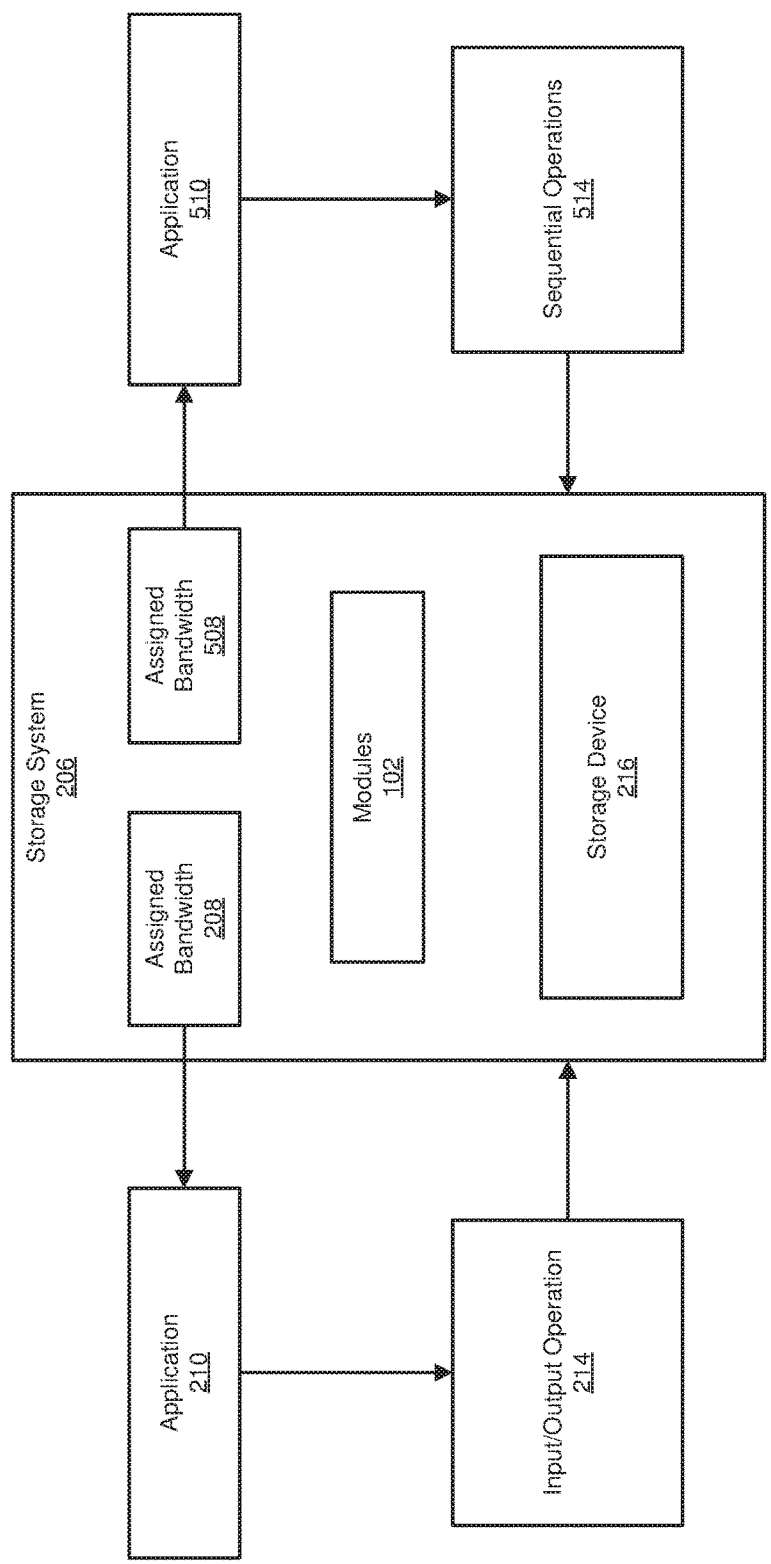
FIG. 5 is a block diagram of an example computing system for allocating input/output bandwidth in storage systems.

In some embodiments, multiple applications may perform operations on storage system 206. With reference to FIG. 5, application 210 may perform input/output operations on storage system 206. An additional application, application 510, may also perform input/output operations on storage system 206. In this example, allocation module 104 may assign assigned bandwidth 208 to application 210, and assign assigned bandwidth 508 to application 510. Application 210 may perform input/output operation 214 on storage system 206, and application 510 may perform sequential operations 514 on storage system 206. As described in greater detail above, one or more elements of modules 102 may treat these sequential operations as a single, larger operation for purposes of determining input/output bandwidth usage. Identification module 108 may identify latencies associated input/output operation 214 and sequential operations 514, and calculation module 110 may calculate the bandwidth usage associated with each operation. Deducting module 112 may then deduct the bandwidth usage associated with input/output operation 214 from assigned bandwidth 208, and deduct the bandwidth usage associated with sequential operations 514 from assigned bandwidth 508.

At step 312 in FIG. 3, one or more of the systems described herein may allocate bandwidth to future input/output requests from the application from the remaining amount of input/output bandwidth allocated to the application. For example, allocation module 104 may, as part of storage system 206 in FIG. 2, allocate bandwidth to future input/output requests from application 210 from the remaining amount of input/output bandwidth allocated to the application. In other words, the remaining amount of input/output bandwidth may represent a balance of allowable actions to be taken by application 210 until allocation module 104 refreshes or allocates additional bandwidth to application 210, as described in connection with step 302 in FIG. 3.

In some examples, application 210 may have an insufficient allocation of input/output bandwidth remaining to fulfill request 212. In these examples, allocation module 104 may prevent application 210 from performing at least one input/output operation requested in request 212 in response to determining that application 210 has an insufficient allocation of input/output bandwidth remaining to perform the requested input/output operation. For example, should application 210 have insufficient credits (as described in connection with calculation module 110) to cover the estimated bandwidth cost of performing an input/output operation on storage system 206, allocation module 104 may prevent application 210 from performing that particular input/output operation. Allocation module 104 and/or deduction module 112 may refrain from deducting credits from application 210 in the event that application 210 is prevented from performing an input/output operation.

As explained above in connection with FIGS. 1-5, a storage system may track applications' bandwidth usage through a credit system, and deduct credits from an application's allocation of credits based on the actual processing time and/or latency induced as a result of fulfilling input/output operations requested by that application. By allocating bandwidth to applications based on actual system impact rather than operation size, the disclosed systems and methods may allow storage systems to more fully utilize available processing bandwidth, thus increasing the number of requests that the storage system is able to handle in a given amount of time.

Furthermore, the systems and methods described herein may further improve the efficiency of a storage system by enabling the storage system to treat bulk or sequential requests from an application as a single larger request for the purposes of allocating bandwidth to various applications. Sequential input/output operations may avoid much of the processing overhead associated with separately and/or randomly submitted operation requests, and therefore have a lower impact on the ability of the storage system to handle further input/output operations despite transferring comparable volumes of data. Again, such bandwidth accounting based on actual system impact rather than simply based on operation size may allow the storage system to more fully utilize available capacity to perform input/output operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or another remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for allocating input/output bandwidth in storage systems, at least a portion of the method being performed by a computing device comprising at least one processor, the method comprising:

allocating, in accordance with a pre-defined service-level agreement, an assigned amount of input/output bandwidth to an application that performs actions on a storage system;

receiving a request from the application to perform an input/output operation on the storage system;

identifying an amount of latency associated with fulfilling the input/output operation, wherein the amount of latency represents a severity of impact on the ability of the input/output system to fulfill other requests to perform input/output operations on the storage system;

calculating an amount of input/output bandwidth consumed by the input/output operation that is proportional to the latency associated with fulfilling the input/output operation instead of the size of the input/output operation;

deducting the amount of input/output bandwidth consumed by the input/output operation from the assigned amount of input/output bandwidth allocated to the application; and allocating bandwidth to future input/output requests from the application from the remaining amount of input/output bandwidth allocated to the application.

2. The method of claim 1, wherein identifying the amount of latency associated with fulfilling the input/output operation comprises measuring an amount of time taken to complete the input/output operation.

3. The method of claim 1, wherein identifying the amount of latency associated with fulfilling the input/output operation comprises calculating an estimated amount of latency that will be induced by the input/output operation based at least in part on whether the input/output operation comprises a plurality of sequential input/output operations.

4. The method of claim 3, wherein calculating the estimated amount of latency comprises calculating the estimated amount of latency based on previous observations of input/output operations that are similar to the input/output operation.

5. The method of claim 1, wherein receiving the request from the application comprises receiving a request to perform a plurality of input/output operations.

6. The method of claim 5, wherein receiving the request from the application comprises treating the plurality of input/output operations as a single input/output operation.

7. The method of claim 6, wherein treating the plurality of input/output operations as a single input/output operation comprises:
calculating the total amount of input/output bandwidth consumed by the plurality of input/output operations; and
deducting the total amount of input/output bandwidth consumed by the plurality of input/output operations.

8. The method of claim 1, wherein the request from the application comprises a request to perform at least one of:
a backup operation;
a restore operation;
a recovery operation; and
a replication operation.

9. The method of claim 1, wherein allocating the assigned amount of input/output bandwidth to the application comprises allocating the assigned amount of input/output bandwidth based on both the number of applications that request input/output bandwidth from the storage system and the capacity of the storage system to perform input/output operations.

10. The method of claim 1, wherein allocating bandwidth to future input/output requests from the application from the remaining amount of input/output bandwidth allocated to the application comprises preventing the application from performing at least one future input/output operation on the storage system in response to determining that the application has an insufficient amount of input/output bandwidth remaining to perform the future input/output operation.

11. The method of claim 1, wherein:
allocating the assigned amount of input/output bandwidth to the application comprises allocating an assigned number of credits to the application;
calculating the amount of input/output bandwidth consumed by the input/output operation comprises converting the latency associated with fulfilling the input/output operation into a number of consumed credits that are consumed by the input/output operation; and
deducting the amount of input/output bandwidth consumed by the input/output operation comprises subtracting the number of consumed credits from the assigned number of credits.

12. The method of claim 11, wherein converting the latency associated with fulfilling the input/output operation into a number of consumed credits comprises converting the latency associated with fulfilling the input/output operation based on a reference latency that represents one credit.

13. A system for allocating input/output bandwidth in storage systems, the system comprising:
an allocation module, stored in memory, that allocates, in accordance with a pre-defined service-level agreement, an assigned amount of input/output bandwidth to an application that performs actions on a storage system;
a receiving module, stored in memory, that receives a request from the application to perform an input/output operation on the storage system;
an identification module, stored in memory, that identifies an amount of latency associated with fulfilling the input/output operation, wherein the amount of latency represents a severity of impact on the ability of the input/output system to fulfill other requests to perform input/output operations on the storage system;
a calculation module, stored in memory, that calculates an amount of input/output bandwidth consumed by the input/output operation that is proportional to the latency associated with fulfilling the input/output operation instead of the size of the input/output operation;
a deduction module, stored in memory, that deducts the amount of input/output bandwidth consumed by the input/output operation from the assigned amount of input/output bandwidth allocated to the application; and
at least one physical processor configured to execute the allocation module, the receiving module, the identification module, the calculation module, and the deduction module.

14. The system of claim 13, wherein the allocation module allocates bandwidth to future input/output requests from the application from the remaining amount of input/output bandwidth allocated to the application.

15. The system of claim 13, wherein the identification module identifies the amount of latency associated with fulfilling the input/output operation by measuring an amount of time taken to complete the input/output operation.

16. The system of claim 13, wherein the identification module identifies the amount of latency associated with fulfilling the input/output operation by calculating an estimated amount of latency that will be induced by the input/ output operation based at least in part on whether the input/output operation comprises a plurality of sequential input/output operations.

17. The system of claim 16, wherein the identification module calculates the estimated amount of latency by calculating the estimated amount of latency based on previous observations of input/output operations that are similar to the input/output operation.

18. The system of claim 13, wherein the receiving module receives the request from the application by receiving a request to perform a plurality of input/output operations.

19. The system of claim 13, wherein the request from the application comprises a request to perform at least one of:
   a backup operation;
   a restore operation;
   a recovery operation; and
   a replication operation.

20. A non-transitory computer-readable medium comprising one or more computer-readable instructions that, when executed by at least one processor of a computing device, cause the computing device to:

allocate, in accordance with a pre-defined service-level agreement, an assigned amount of input/output bandwidth to an application that performs actions on a storage system;

receive a request from the application to perform an input/output operation on the storage system;

identify an amount of latency associated with fulfilling the input/output operation, wherein the amount of latency represents a severity of impact on the ability of the input/output system to fulfill other requests to perform input/output operations on the storage system;

calculate an amount of input/output bandwidth consumed by the input/output operation that is proportional to the latency associated with fulfilling the input/output operation instead of the size of the input/output operation;

deduct the amount of input/output bandwidth consumed by the input/output operation from the assigned amount of input/output bandwidth allocated to the application; and allocate bandwidth to future input/output requests from the application from the remaining amount of input/output bandwidth allocated to the application.

* * * * *